United States Patent [19]

Condon et al.

[11] 4,006,314
[45] Feb. 1, 1977

[54] DIGITAL INTERFACE FOR RESYNCHRONIZING DIGITAL SIGNALS

[75] Inventors: Joseph Henry Condon, Summit; Robert Bruce Kieburtz, Fair Haven, both of N.J.

[73] Assignee: Bell Telephone Laboratories, Incorporated, Murray Hill, N.J.

[22] Filed: Jan. 29, 1976

[21] Appl. No.: 653,349

[52] U.S. Cl. .......................... 179/15 BS; 178/69.1
[51] Int. Cl.² ......................................... H04J 3/06
[58] Field of Search ............ 179/15 BS; 178/69.5 R

[56] References Cited
UNITED STATES PATENTS

| 3,869,579 | 3/1975 | Karl | 179/15 BS |
| 3,916,107 | 10/1975 | McDonald | 179/15 AP |
| 3,928,727 | 12/1975 | Roche | 179/15 BS |
| 3,928,755 | 12/1975 | Bellanger et al. | 235/152 |
| 3,936,604 | 2/1976 | Pommerening | 178/69.5 R |

*Primary Examiner*—Thomas W. Brown
*Attorney, Agent, or Firm*—John Francis Moran

[57] ABSTRACT

An elastic interface is disclosed for two communicating digital carrier systems autonomously synchronized to disparate time bases independent of each other in frequency and phase. The interface includes two arrangements, one for each direction of transmission between the two digital systems. In an illustrative application for the interface in a telephone system, the first of the two digital systems is a digital transmission system while the second is a time-division-multiplex switching network. The different internal constraints of each system call for digital signals at variance in sampling rate and code format. The interface amply satisfies the difference in sampling rate by an interpolation process which supplies the requisite number of intermediate encoded signal samples. Code conversion techniques are employed to match the code format of each digital system. Flexibility in the interpolation process is provided by adjusting the value of the encoded samples in response to changes in the relative time intervals between each encoded sample being supplied to one digital system and the encoded samples from the other digital system upon which it is derived. The digital signal medium established in the interface preserves the quality of the information traversing the medium as the digital signals coupled thereto undergo a change in sampling rate even though the autonomous operation of each of the two digital systems occasions relative frequency drift between the time bases of the two digital systems.

14 Claims, 9 Drawing Figures

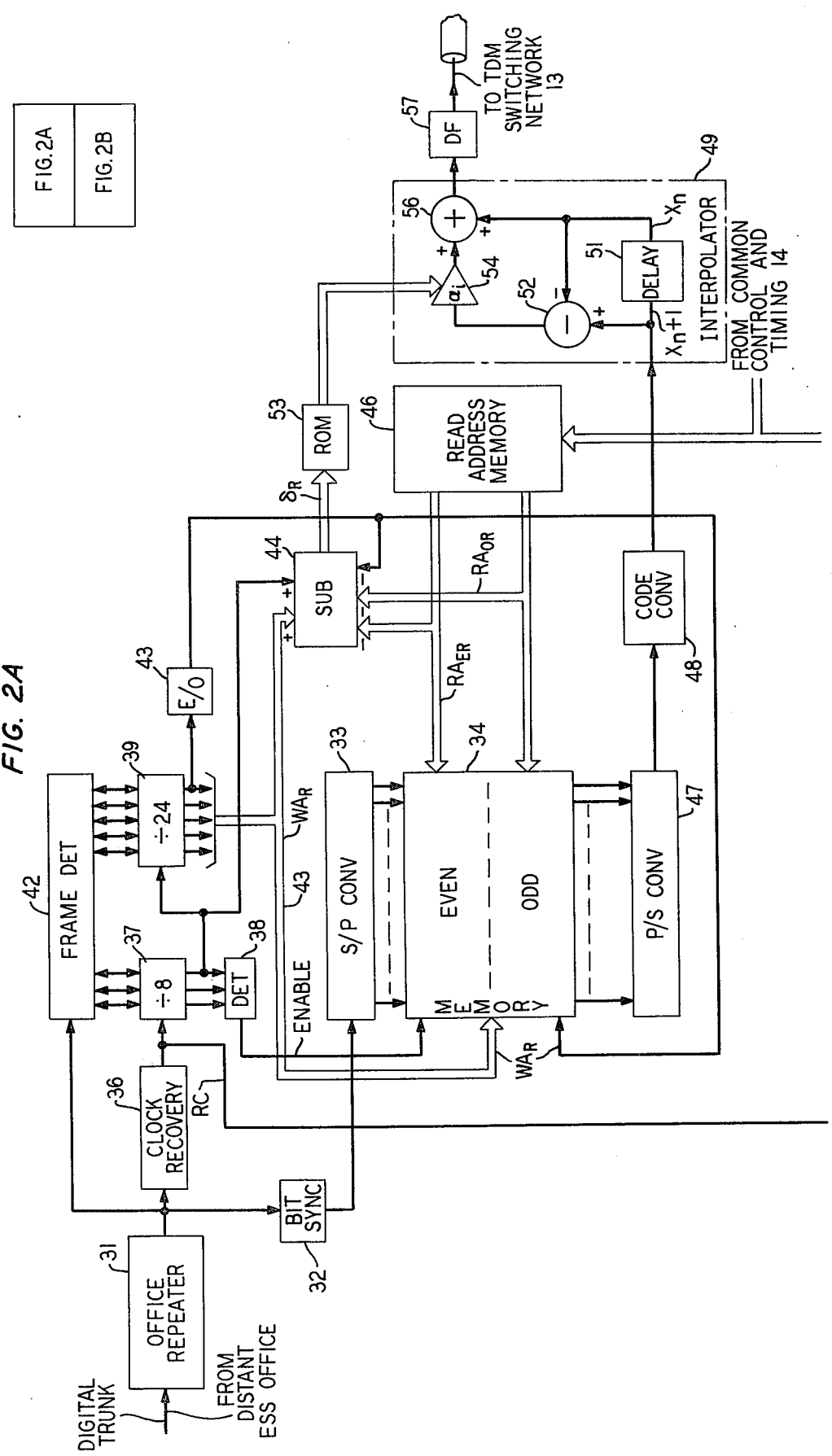

FIG. 4

| $\delta_R$ | $\alpha_i$ | $\delta_R$ | $\alpha_i$ | $\delta_R$ | $\alpha_i$ | $\delta_R$ | $\alpha_i$ |
|---|---|---|---|---|---|---|---|
| 0 | .00000000 | 12 | .14644665 | 24 | .50000000 | 36 | .85355294 |
| 1 | .00107062 | 13 | .17032701 | 25 | .53270102 | 37 | .87591922 |
| 2 | .00427777 | 14 | .19561911 | 26 | .56526256 | 38 | .89667618 |
| 3 | .00960743 | 15 | .22221476 | 27 | .59754467 | 39 | .91573429 |
| 4 | .01703715 | 16 | .25000000 | 28 | .62940884 | 40 | .93301225 |
| 5 | .02653503 | 17 | .27885526 | 29 | .66071904 | 41 | .94843590 |
| 6 | .03806031 | 18 | .30865806 | 30 | .69134128 | 42 | .96193945 |
| 7 | .05156362 | 19 | .33928001 | 31 | .72114360 | 43 | .97346473 |
| 8 | .06698734 | 20 | .37059015 | 32 | .75000000 | 44 | .98296261 |
| 9 | .08426523 | 21 | .40245450 | 33 | .77778459 | 45 | .99039245 |
| 10 | .10332334 | 22 | .43473649 | 34 | .80437994 | 46 | .99572217 |
| 11 | .12408006 | 23 | .46729797 | 35 | .82967234 | 47 | .99892926 |
| 12 | .14644665 | 24 | .50000000 | 36 | .85355294 | 48 | 1.0000000 |

FIG. 5

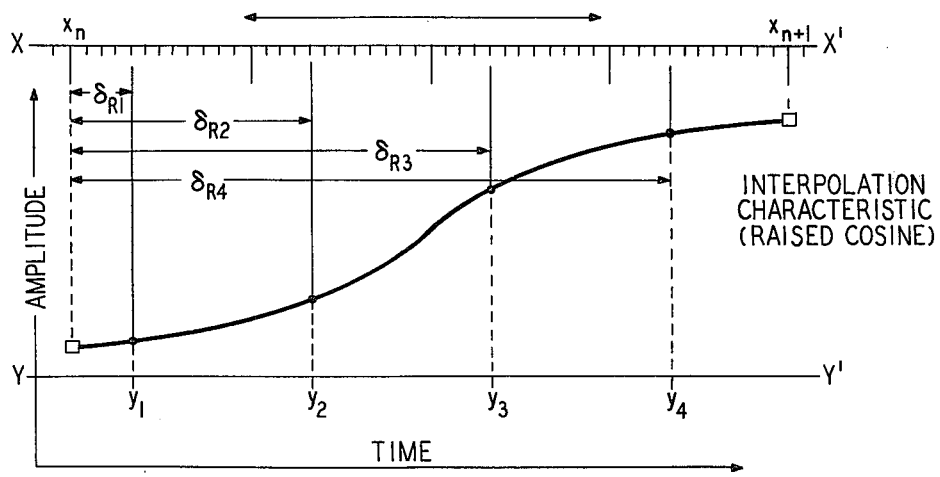

XX' — TIME BASE OF INCOMING SIGNAL
YY' — TIME BASE OF INTERPOLATED SIGNAL
$x_n, x_{n+1}$ — AMPLITUDE VALUES OF ONE INTELLIGENCE AS INDICATED BY A PAIR OF CODE WORDS IN THE INCOMING SIGNAL
$y_1, y_2, y_3, y_4$ — AMPLITUDE VALUES DERIVED BY INTERPOLATION BETWEEN $x_n$ AND $x_{n+1}$
$\delta_{R1}, \delta_{R2}, \delta_{R3}, \delta_{R4}$ — TIME INTERVALS USED TO DERIVE INTERPOLATED CODE WORDS XX' - SWITCH TIME BASE
YY' - OUTGOING TRUNK TIME BASE
$x_1$-$x_5$ - AMPLITUDE VALUES OF A SIGNAL FROM SWITCH
$y_1$-$y_3$ - AMPLITUDE VALUES DERIVED BY INTERPOLATION

| $\delta_T$ | $h_j$ | $\delta_T$ | $h_j$ | $\delta_T$ | $h_j$ | $\delta_T$ | $h_j$ |
|---|---|---|---|---|---|---|---|
| 0 | 0.00000000 | 12 | 0.00000000 | 24 | 1.00000000 | 36 | 0.00000000 |
| 1 | -.01379242 | 13 | .08651610 | 25 | .95167816 | 37 | -.02440198 |
| 2 | -.02700614 | 14 | .17824054 | 26 | .89120376 | 38 | -.04243822 |
| 3 | -.03906250 | 15 | .27343750 | 27 | .82031250 | 39 | -.05468749 |
| 4 | -.04938269 | 16 | .37037021 | 28 | .74074066 | 40 | -.06172837 |
| 5 | -.05738808 | 17 | .46730298 | 29 | .65422463 | 41 | -.06413963 |
| 6 | -.06250000 | 18 | .56250000 | 30 | .56250000 | 42 | -.06250000 |
| 7 | -.06413963 | 19 | .65422440 | 31 | .46730322 | 43 | -.05738811 |
| 8 | -.06172840 | 20 | .74074054 | 32 | .37037051 | 44 | -.04938272 |
| 9 | -.05468749 | 21 | .82031250 | 33 | .27343750 | 45 | -.03906250 |
| 10 | -.04243828 | 22 | .89120352 | 34 | .17824078 | 46 | -.02700618 |
| 11 | -.02440204 | 23 | .95167804 | 35 | .08651637 | 47 | -.01379246 |
| 12 | 0.00000000 | 24 | 1.00000000 | 36 | 0.00000000 | 48 | 0.00000000 |

DIGITAL INTERFACE FOR RESYNCHRONIZING DIGITAL SIGNALS

BACKGROUND OF THE INVENTION

This invention relates to synchronization of digital signals and, more particularly, to the resynchronization of pulse coded signals at an interface between two digital systems that operate according to separate time bases which are not synchronized to each other.

Digital signal operations, whether they are in a digital signal transmission system, a coder, a decoder or some kind of signal processing arrangement, require some type of predetermined time base that periodically produces timing information or signals upon which systematic functions are based to provide orderly operations. Timing signal operations or synchronization is provided by using all or selectable signals from a time base signal produced by a local oscillator or local clock. Although such oscillators are designed to produce a stable time base signal of a predetermined constant frequency, all oscillators are subject to a finite inaccuracy in frequency in addition to some value of time-varying frequency drift. Accordingly, two identically designed oscillators with the same specifications will most likely produce signals that are slightly different in frequency and have a time-varying frequency difference.

When a plurality of digital systems are connected together to communicate with one another, compatible operation requires overall synchronism of systematic functions. To provide compatible operation, the local oscillators of digital systems are generally synchronized or phase locked together to prevent the time-varying frequency drift among the various local oscillators. If the frequency drift is not eliminated, data may be lost or erroneously processed.

When various portions of an overall digital communication system are spread out to serve a geographic area, reliable synchronization of local oscillators at different locations in the system may require additional communication links to a master clock which increases the cost of these systems. As the distances are increased to cover larger areas, differences in propagation delay times of various signal paths including those used for synchronization purposes are sufficient to produce synchronization problems. Furthermore, failure of the master clock or any of the communication links used for synchronization are additional sources of system failure.

One conventional solution of providing an interface between independently synchronized digital systems is to convert the digital information of one system to analog and then reconvert the analog signal back to a digital signal that is retimed according to the time base of another system. Another technique is to convert the pulse code modulated (PCM) signal to a delta modulated signal and then reconvert back to a PCM signal in accordance with a second time base. Both arrangements utilize signal conversion which is undesirable in terms of the equipment needed to implement the conversion and amplitude approximations inherent to signal conversion techniques which degrade the quality of the information content of the signal undergoing conversion. A further drawback of the latter technique is that if the digital signals of the two systems are not encoded using the same sampling rate, it provides the rate change by simply repeating or deleting digital signals which also degrades the quality of information.

It is an object of the present invention to provide a flexible interface between cooperating but autonomously synchronized digital systems using a minimum amount of signal conversions that automatically compensates for frequency difference and drift caused by either the temporary or permanent absence of synchronization thereby improving overall system performance and reliability.

SUMMARY OF THE INVENTION

The invention in its various aspects overcomes the limitations of prior art interfaces. Broadly, the invention provides an all digital signal coupling medium with inherent flexibility to accommodate a small, commonly present, but varying, frequency drift in the signaling rate between the two digital systems. In some of its more specific aspects, the invention provides a change in sampling rate of digital signals by adapting the value of the encoded samples outgoing from the medium in response to real time changes in the relative timing sequence in the occurrence of the encoded samples of the two digital systems coupled through the medium.

In its broader aspects, the invention takes the form of an elastic interface between two communicating digital systems autonomously synchronized to individual time bases independent of each other in frequency and phase. The systems communicate using code groups of digital signals. The interface includes a memory which stores code groups derived from the code groups of the first of the two digital systems. The contents of the memory are obtained therefrom to produce code groups for the second of the two digital systems at a second rate synchronized in accordance with the time base of the second system. The occurrence of the code groups for the second digital system is measured by a timing arrangement with respect to the occurrence of the code groups produced by the first digital system. A multiplier in circuit with the memory has variable gain controlled in accordance with the timing arrangement. The multiplier produces an output indicative of the product of the quantized amplitude indicated by at least one code group from the first system and the gain therein. An adder combines the output of the multiplier with the selected code groups obtained from the memory to produce code groups for the second system wherein each code group is derived from at least one code group from the first system. The output signal of the interface is synchronized in accordance with the second time base to supply an interpolated signal compatible with the second digital system. In accordance with a fundamental aspect of the invention, the flexibility of changing the gain of the multiplier in response to differences in the time of the occurrence of the code groups from the two systems accommodates for differences in frequency and phase between the two time bases by preserving substantially the same information content in the interpolated signal as that indicated by the digital signal from the first system.

In some of its more specific aspects, the timing arrangement is connected to the multiplier by a translator which has a predetermined characteristic. In one embodiment of the invention, the transfer characteristic corresponds to a portion of a raised cosine curve. In the second embodiment of the invention, the transfer characteristic corresponds to a portion of the curve produced by a third order polynomial. The memory in each embodiment has a structure wherein each location stores a code group. The memory in each embodiment also operates as a time-slot interchanger by reading the code groups out with an address sequence different from the address sequence used as the code groups are applied to the memory. The different address sequences are applied to a subtractor whose output is applied to the translator. The memory capacity in each of these embodiments is different. In addition, the memory of the second embodiment is adapted to operate as an accumulator.

BRIEF DESCRIPTION OF THE DRAWING

A more complete understanding of the invention and the various features, additional objects, and advantages thereof may be more readily appreciated and better understood by reference to the following detailed description in conjunction with the drawing in which:

FIGS. 2A and 2B, when juxtapositioned as shown in FIG. 3, illustrate a block diagram of apparatus arranged in accordance with the invention;

FIGS. 4 and 5 serve to explain the operation of the apparatus arranged according to FIG. 2A.

DETAILED DESCRIPTION

Figure 1:
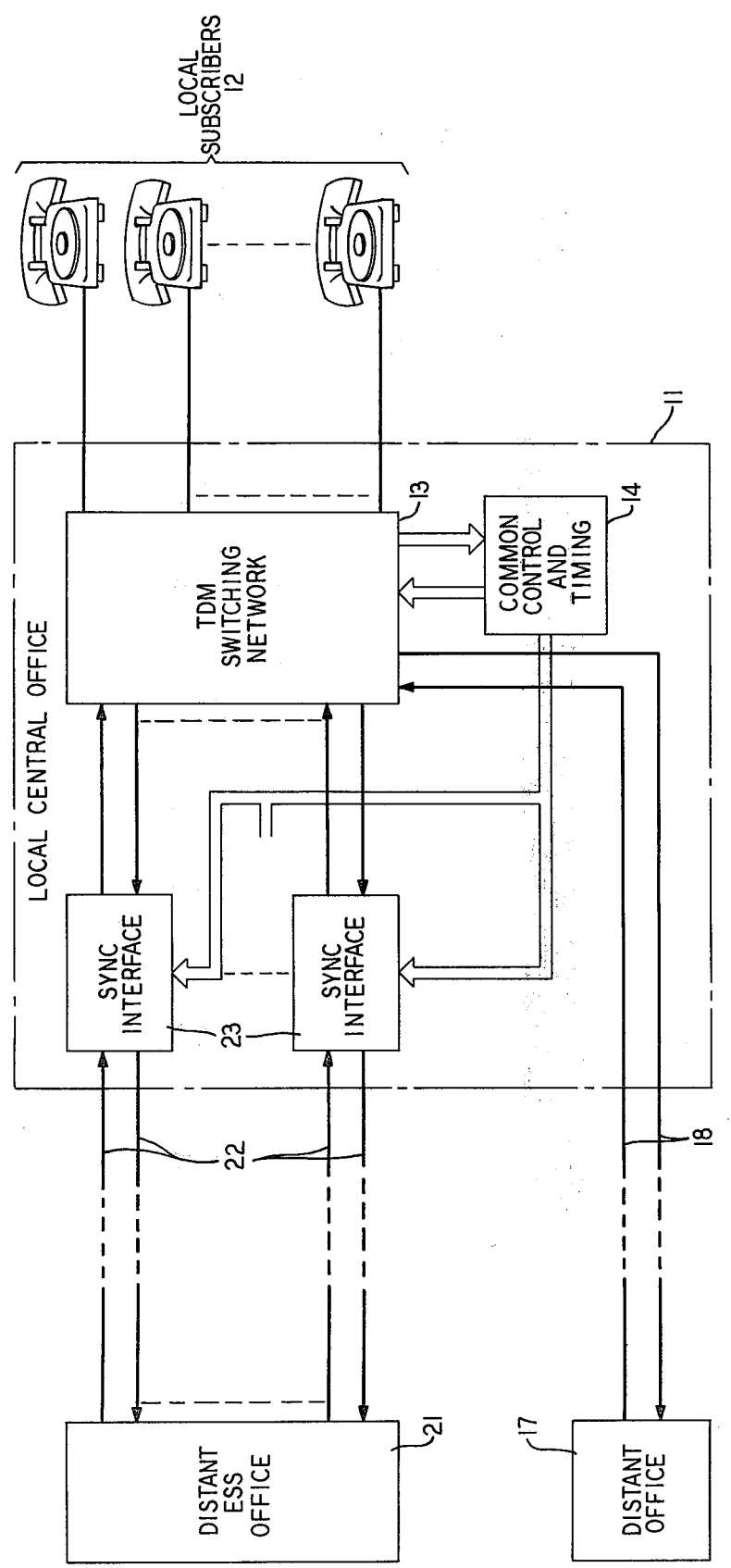
FIG. 1 is a diagram of a portion of a telephone system.

FIG. 1 represents a simplified portion of a telephone system that illustrates one advantageous application of the present invention. It should also be pointed out that only apparatus relevant to the application and description of the invention is shown and that other apparatus normally included in the portion of the telephone system of FIG. 1 are intentionally omitted for the sake of clarity. In FIG. 1, a local central telephone office 11 serves local subscribers 12 utilizing a time division multiplexed (TDM) switching network 13 to establish connections between the subscribers under the direction of common control and timing 14. Network 13 and common control 14 are simply indicated in FIG. 1 as blank blocks which include many conventional system functions of no direct concern to the present invention. Details of network 13 and common control 14 are considered to be well known, are not part of this invention, and are hereinafter mentioned only briefly. An example of a typical time division switching network operated by a common control processor and timing is disclosed in U.S. Pat. No. 3,736,381, issued to Johnson et al on May 29, 1973. Such a switching network is classified as a store-switch-store-switch-store form of network. Network 13 services a plurality of local subscribers 12 and communicates via a pair of digital trunks 18 with distant office 17. Distant office 17, for example, may be an electromechanical type telephone office wherein the digital signals from trunk 18 are converted to analog signals before being switched to provide connections to the associated local subscribers of that office. Since distant office 17 is a conventional type of telephone office, trunks such as those represented by trunk 18 which communicate between central office 11 and distant office 17 may be conveniently synchronized to the operations of network 13 and common control 14. Accordingly, digital trunks do not present any synchronization problems for central office 11.

Also shown in FIG. 1 is a distant electronic switching system (ESS) office 21 which is a TDM telephone office including its own common control and timing facilities. Communicating between distant office 21 and central office 11 are a plurality of pairs of trunks 22. Trunks 22 are synchronized to the operations performed within office 21 and therefore appropriate action must be taken to insure that the operation of trunks 22 is compatible with network 13. Utilization of the present invention within each of a plurality of synchronization interfaces 23 coupling trunks 22 to network 13 should be understood to represent only one of many possible applications for realizing the advantages of the present invention.

In order to appreciate the operations performed within the number of synchronization interfaces 23, it is necessary to consider the characteristics of the digital signals in both trunks 22 and network 13. Each pair of trunks 22 may be considered a separate T carrier type digital transmission system, such as the T1 Carrier Transmission System of the Bell Telephone System, which operates at the rate of 1.544 megabits per second. The digital signals are transmitted over trunks 22 in fixed blocks called frames. Normally each frame includes a digital code word from each of 24 information or voice-band channels. Each digital word is a group of 8 bits in a nonlinearly encoded or companded pulse code modulation (PCM) format at the sampling rate of 8 kilosamples per second. At the end of each 192 information bits in a frame, a final bit is added for framing synchronization purposes in the digital bitstream. Network 13, on the other hand, is designed for digital signals produced by a faster sampling rate of 32 kilosamples per second. In addition to the 4:1 speedup there is also a basic difference in the format of the digital signals. Each digital word in switching network 13 is a 9 bit word linearly encoded utilizing differential PCM. The speedup of the rate of digital signals plus the conversion from nonlinear PCM to linear differential PCM enables the simplification and substantial saving in the hardware of the various filtering operations that are performed within network 13 at a modest increase in hardware cost associated with the speedup. The invention is hereinafter described in a time division multiplex environment since pulse coded signal channels, such as those represented by trunks 22, are frequently utilized in such an environment.

Figure 2B:
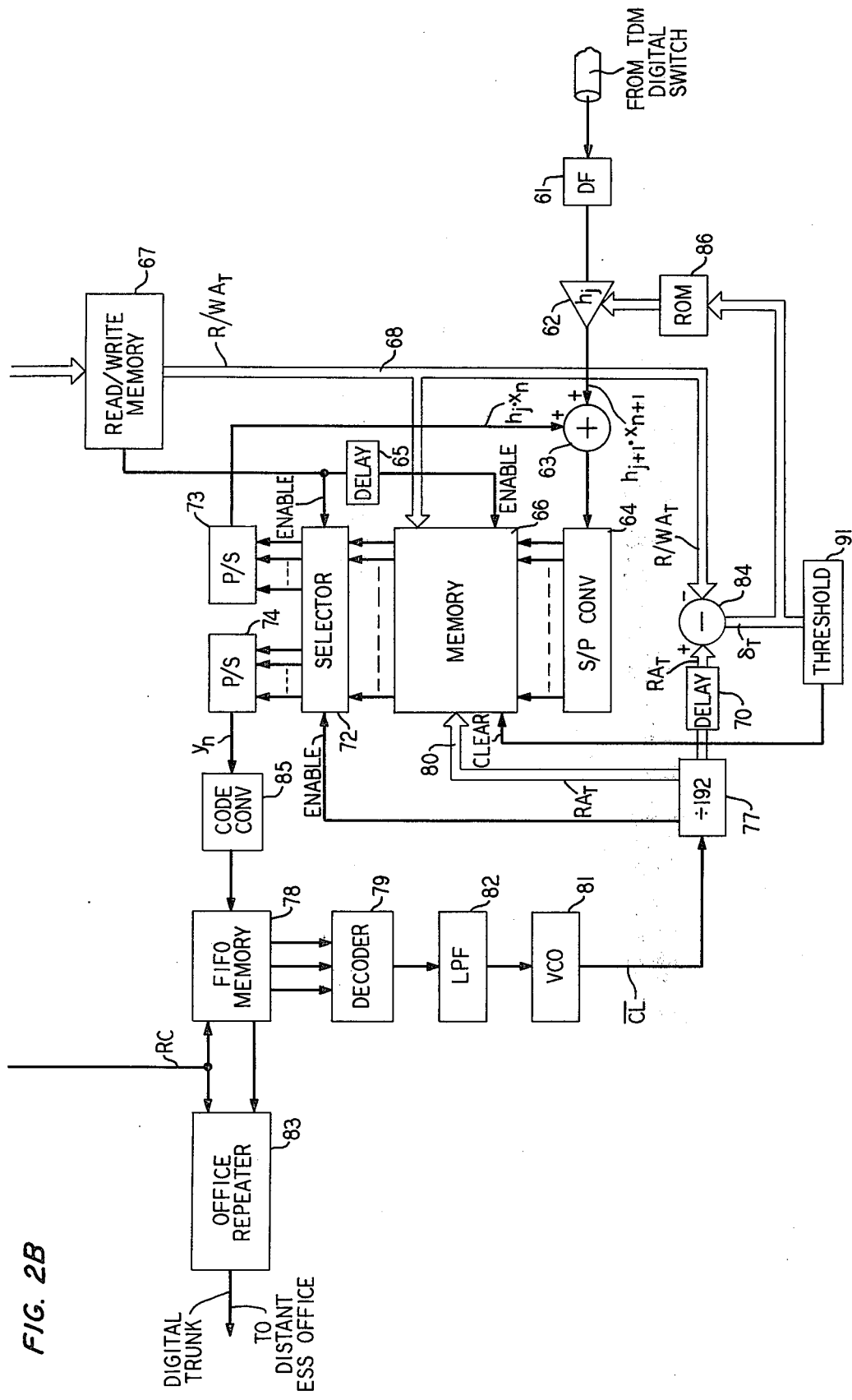

A complete block diagram of synchronization interfaces 23 of FIG. 1 includes the apparatus shown in FIGS. 2A and 2B, which should be aligned as shown in FIG. 3. Since the apparatus depicted in each portion of FIG. 3 operates in a more or less independent fashion, FIG. 2A which receives the incoming signal from trunk 22 and provides an input to switching network 13 will be described first. Office repeater 31 is the final repeater of a repeatered line which regenerates the transmitted signal like other repeaters serially displaced along the length of the digital transmission link simply represented as one of trunks 22 in FIG. 1. Repeater 31 may, in addition, change the bipolar signal format conventionally used in digital transmission into the appropriate unipolar digital signal format associated with the type logic circuitry used to implement the apparatus of FIG. 2A. The output of office repeater 31 is applied via bit synchronizer 32 to serial-to-parallel converter 33. Synchronizer 32 insures that converter 33 is loaded without loss or repetition of bits in each code group. Synchronizer 32 may be an integrated circuit such as the SN54120 Dual Pulse Synchronizer of Texas Instruments, Inc. described at pages 264–268 in the TTL Data Book for Design Engineers, copyrighted by same in 1973. Converter 33 is a serial shift register whose number of cells corresponds to the number of bits in a code group from trunk 22. Converter 33 serves as the input device for memory 34. The output of office repeater 31 is also applied to clock recovery circuit 36. Clock recovery circuit 36 is a conventional arrangement such as a resonant tank circuit or a phase-locked loop that provides a series of output pulses at a pulse rate corresponding to the bit rate of the received signal on trunk 22. The output clock recovery circuit 36 is applied to counter 37 which divides by eight. Detector 38 detects the all 1 state or full count output of counter 37 and produces an enable signal for memory 34. During framing synchronized operation, the enable signal is produced to transfer each completed code group from converter 33 to memory 34. Counter 39 receives the output of the final stage of counter 37 and divides by 24. While the apparatus in FIG. 2A is synchronized, counter 39 changes count in coincidence with the beginning of each incoming code group at memory 34. Accordingly, counter 39 serves to identify the location of each code group in the frame as it is being received.

The framing bits included in the frames of the received bitstream from trunk 22 are identified by frame detector 42. Once frame detector 42 identifies the precise location of the frames in the bitstream, it sets counters 37 and 39 to zero so that counter 37 counts the bits within each digital word and counter 39 maintains a count indicative of the location of each digital word within the framing pattern of the incoming bitstream to provide synchronized operation. Concurrent with the enabling output of detector 38, counter 39 produces an output corresponding to the location of the digital word in the received framing pattern on the number of parallel conductors represented by bus 43 to provide the write address signals for memory 34. Bus 43, like other buses used in the drawing, is designated by a double lined conductor. Bus 43, in this case, includes five parallel conductors.

Memory 34 is a read/write random access memory which is organized into lines which have a capacity to store a code group. Memory 34 is divided into two sections designated as even and odd portions. Each of these portions has sufficient capacity to store a complete frame of digital signals from trunk 22. The addressing count of counter 39 indicates the lines location while flip-flop 43 indicates in which portion of the memory the contents of converter 33 are to be stored. The first received frame and successive odd frames of signals from trunks 22 are written into the odd portion of the memory 34. The second frame of incoming signals from trunk 22 including successive even frames are written into the even portion of memory 34.

It should be noted that the first code group in each frame corresponds to the first information channel on up to the last code group in the frame which corresponds to the 24th information channel. This successive numbering system is utilized to store successive code groups in sequential lines of memory 34. Each line has one address location and stores a complete code group. Memory 34 primarily serves to provide the encoded versions of two successive samples of a given information channel for interpolation purposes each time an input is called for at network 13 by common control 14.

The output of the final stage of counter 39 is applied to even/odd flip-flop 43 which serves to indicate whether the framing pattern currently being received is odd or even. The output of flip-flop 43 is applied to subtractor 44 along with the output of counter 39 and the output of the final stage of counter 37. The outputs of counter 39 provide the write address information for each digital word in memory 34. The write address information is applied to memory 34 as the write address receive ($WA_R$) signal on bus 43. At this point, it should be noted that all of the operations of the aforementioned apparatus in FIG. 2A are synchronized with the incoming signal from trunk 22 that is written into memory 34.

The output from common control and timing 14 is applied to read address memory 46. Memory 46 provides two parallel outputs, designated as the read address even or odd receive ($RA_{ER}$ or $RA_{OR}$), for addressing two successive code groups of the same information channel within memory 34 to derive each interpolated code group. As one output bus of memory 46 interrogates memory 34 at the location corresponding to the oldest code group, the output of flip-flop 43 identifies same. Upon the occurrence of this address at memory 34, the contents therein are transferred to parallel-to-serial converter 47.

The output of parallel-to-serial converter 47 is applied via code converter 48 to interpolator 49. Code converter 48 changes the bit content of each of the nonlinearly encoded groups stored in memory 34 to a linearly coded group for utilization by interpolator 49. Converter 48 is a conventional circuit commonly known as a digital expandor such as shown in FIG. 15 of an article entitled "A Unified Formulation of Segment Companding Laws and Synthesis of Codecs and Digital Compandors" by H. Kaneko in *The Bell System Technical Journal*, Vol. 49, No. 7, Sept. 1970, pages 1555–1588. An arrangement for providing the inverse operation of digital compressing is shown in FIG. 16 of the aforementioned article. The inverse function is performed by code converter 85 of FIG. 2B. The next address signal produced by memory 46 from the other output thus corresponds to code groups of the next successive sample of the same information channel stored in memory 34. Upon the occurrence of this address signal, the output of converter 47 transfers the stored code group at that address as modified by converter 48 to interpolator 49. As the pair of code groups emerge from converter 48, the timing interval between the pair of two successive code groups is equal to the propagation delay of delay 51 so that both code groups are available from the input and output of the delay. Since the inputs to subtractor 52 are connected to the input and output of delay 51, the output of the subtractor provides the difference between these two signals.

The other input to interpolator 49 is supplied by memory 53. The input to memory 53 from subtractor 44 is produced by subtracting the read address signal of the first encoded sample from the concurrent write address signal of the code group that is being presently written into memory 34 from converter 33 at the time the interpolator code group is called for by common control 14. The first encoded sample is the first code group of the pair to arrive of the two successive encoded samples of the same signal channel utilized by interpolator 49 to produce an interpolated code group. As counters 37 and 39 provide the write address locations of the code groups within memory 34, they also divide the interval between two successive code groups of the same signal channel into 48 increments. This is readily accomplished since each framing pattern contains 24 code words and the final output of the last state of counter 37, which is applied to subtractor 44, changes at twice the rate of the output of counter 39. Accordingly, subtractor 44 produces a binary number output in a range corresponding from 0 − 48 once each time two successive code groups are obtained from memory 34. This output of subtractor 44 serves to identify the relative position of each interpolated code group within the interval defined between the arrival of the pair of two successive code groups at memory 34. Memory 53 transforms the output of subtractor 44 into a coefficient $\alpha_i$ which controls the gain of multiplier 54. The output of multiplier 54 is applied to one input of adder 56. Concurrent with each output of multiplier 54 is the output from delay 51. The function of adder 56, therefore, is to add a weighted quantity of the difference between two successive code groups to the oldest code group. The output of interpolator 49 which comes from adder 56 is applied to digital filter 57. Digital filter 57 compensates for the high frequency roll-off produced by the interpolation function performed by interpolator 49. This digital filter is a fourth order filter of conventional design which may be realized, for example, by cascading two second order sections of the type shown in either FIGS. 2 or 3 of U.S. Pat. No. 3,777,130, issued to Croisier on Dec. 4th, 1973. Alternatively, filter 47 may be realized by a single fourth order section of the Croisier type filter. The final function of filter 57 is to convert the PCM interpolated code group to a differential PCM code group, which is supplied to switching network 13 of FIG. 1.

The operation of interpolator 49 of FIG. 2A will be discussed in greater detail with reference to FIGS. 4 and 5. As previously pointed out subtractor 44 produces a digital number, designated in FIG. 4 as $\delta_R$. This number can be considered as a phase variable indicative of the relative position of the interpolated code group between the pair of code groups from which it is derived. In the table of FIG. 4 corresponding values of $\alpha_i$ are listed for each value of $\delta_R$. In operation a pair of two successive code groups from the same information channel is supplied to interpolator 49 which are represented by $x_n$ and $x_{n+1}$ on the upper time scale XX' of FIG. 5. The bidirectional arrow above the XX' time scale represents relative frequency drift between the clock than runs trunk 22 and the internal clock of common control and timing 14 of FIG. 1 which produces a lateral displacement between time scales XX' and YY'.

As previously pointed out switching network 13 operates utilizing code groups indicative of a 32 kilosample per second rate or four times the rate of the incoming signal on the digital transmission systems represented by trunks 22 of FIG. 1. Accordingly, on the average four interpolated code groups are derived depicted as $y_1$ to $y_4$ in FIG. 5 from each pair of successive code groups.

Since the occurrences of the interpolated code groups are determined by common control 13, their relative position between the pair of code groups is measured by subtractor 44 of FIG. 2A and used as a basis for interpolation. Subtractor 44 subtracts the read address of the oldest of the two successive code groups from the current write address that is supplied by counter 39. The output of subtractor 44, in effect, measures the time interval between when the oldest code group is written into memory 34 and when this same code group is read out of memory 34 to provide the interpolated code group. It should be understood that the combined count of all the outputs of counter 39 and the final output of counter 37 never exceeds 48 or counts modulo 48. Thus, the difference between the two addresses or $\delta_R$ does not exceed 48 although the interval for which the older encoded sample is stored in memory 34 actually exceeds the interval between two successive encoded signal samples of the same signal channel since both encoded samples must be available before the interpolation can take place.

A significant feature of the application illustrated in FIG. 1 is that synchronization interface is ideally suited to perform the initial storing function which is necessary for the operation of switching network 13. In addition to the storing function, switching is also accomplished by changing the sequence in which the signals are read out of memory 38 from the sequence in which they are written into same. This switching function in combination with the storing function is well known in the art as a time slot interchange function. Accordingly, the output of subtractor 44 is an actual measure of how long the oldest encoded sample is retained in memory 34 after the next successive code group of the same information channel arrives in the memory. Based upon this disclosure, one skilled in the art may realize the advantages of this invention by using the second or newer code group of the pair of code groups from memory 34 in a similar fashion to determine $\delta_R$ which would, of course, entail a slight modification of the circuitry shown in FIG. 2A.

Read-only memory 53 transforms $\delta_R$ into a coefficient $\alpha_i$ which is the weighting factor assigned to the difference between the amplitude of the pair of code groups. Then the weighted difference between the pair of code groups is algebraically added to the oldest code group by adder 56 to provide the output of interpolator 49. This operation can be expressed by $$y_i = x_n + \alpha_i (x_{n+1} - x_n). \tag{1}$$

On the average, four successive interpolated code groups are derived from each pair of code groups from memory 34. Furthermore, each code group from memory 34 is used twice: once as the newest sample and then once as the oldest sample to provide the sampling rate increase of 4:1.

As shown in FIG. 5 the coefficients $\alpha_i$ define a smooth curve which spans between $x_n$ and $x_{n+1}$ wherein the value of $\alpha_i$ varies from zero to unity. The variation of the values of $\alpha_i$ determines the shape of the smooth curve which, in this case, conforms to one-half period of a raised cosine. It should be pointed out that if the amplitude of $x_{n+1}$ were less than $x_n$, then the raised cosine curve would have a negative slope instead of the positive slope shown in FIG. 5.

To appreciate the significance of the raised cosine curve, one must examine the effects on the interpolated signal produced by this process. There are two prominent effects. A fixed roll-off in the passband (i.e., 0 to 4000 Hertz) of the Nyquist sampled signal is introduced. This effect may be readily offset by using a compensating passband characteristic in digital filter 57 of FIG. 2A. The second effect is a time-varying roll-off or amplitude fluctuation on the signal for which compensation cannot readily be provided. The shape of the curve used in the interpolation process is significant since it determines the frequency range in which the effect of the time-varying roll-off occurs. The use of the raised cosine instead of a straight line has the beneficial effect of raising the frequency range of the time-varying roll-off from the passband to above passband. Thus, the effect of the time-varying roll-off may be essentially eliminated by suitable selection of a passband characteristic in digital filter 57 of FIG. 2A. It should be understood that other and different characteristics may be chosen by those skilled in the art based upon the information presented herein. In such cases, different values will be selected for $\alpha_i$ in FIG. 4 and curve of FIG. 5 will also have a different shape.

Operation of interpolator 49, in combination with memory 34 and associated apparatus, provides a completely elastic interface wherein incoming signals are synchronized to one timing source while the interpolated output signals are produced in synchronization with a second timing source. Unlike a conventional buffering arrangement which is elastic only to the extent allowed by the capacity of the buffer and thus can only compensate for relatively short term frequency drift, the apparatus of the invention has inherently designed into it the ability to compensate for a continuous frequency difference in pulse rate caused by the unsynchronized operation of the two aforementioned timing sources. Interpolator 49 achieves this feature by altering the amplitude of the interpolated code group to allow for the shift in position of the interpolated code group relative to the received code groups from which it is derived. In view of this unique feature, the expression of "on the average" is used to describe the number of interpolated code groups derived from each pair of successive code groups since there will be occasions albeit infrequently in which three or five interpolated code groups are derived from a pair of successive code groups. Whether more or less than four interpolated code groups are derived from a pair of code groups is determined by whether the incoming bit rate from the trunk is faster or slower than the bit rate called for by the switch. The foregoing feature will even become more apparent in the discussion of FIGS. 6, 7 and 8 which will facilitate the explanation of the interpolation process of FIG. 2B.

The apparatus of FIG. 2B provides an interface between the output from switching network 13 and the input to digital trunk 22, which are respectively indicated at the lower right-hand corner and the upper left-hand corner of the figure. Before any further description of the apparatus in FIG. 2B, one should consider that the circuitry generally operates in a similar manner to the apparatus shown in FIG. 2A. It should also be kept in mind that the inverse of signal operations described in connection with FIG. 2A are performed in FIG. 2B. It is also helpful to note that basic differences in the circuitry become apparent upon comparison of these two figures which is largely due to the fact that the sampling rate is decreased rather than increased as in FIG. 2A.

The date input from switching network 13 is applied to digital filter 61 which is a conventional digital filter that performs bandpass filtering of the signal. Filter 61 may be realized by coupling together two first order high-pass sections followed by a low-pass portion comprising either two second order sections or a fourth order section of the Croisier type. Filter 61 further provides a code conversion from differential PCM signal to linear PCM signal.

In addition to filter 61, the signal path from switching network 13 includes digital multiplier 62, adder 63 and serial-to-parallel converter 64 which serves as an input device for memory 66. Memory 66 has a structure similar to memory 34 but only serves as a one-frame store and further provides a time-slot interchange function similar to memory 34 of FIG. 2B. Memory 66 also serves as an accumulator for storing partial terms of interpolated signals during the interpolation process.

The signal from switching network 13 is produced in blocks or frames which contain a digital word from each of 24 different signal channels. The order in which these digital words arrive from the different signal channels is a function of the switching operations of network 13 in FIG. 1 and the time slot interchange operation which occurs in FIG. 2A. It should be noted that code words from each channel are digitally derived words from the interpolation process produced in that apparatus of FIG. 2A so that each code word is the equivalent of the analog signal represented by the digital signal in trunks 22 of FIG. 1 being sampled at a 32 kilosample per second rate. The apparatus in FIG. 2B converts these 32 kilosample per second digital signals back to an 8 kilosample per second digital output signal compatible for transmission on trunks 22 of FIG. 1. On the average, four 32 kilosample per second samples from one signal channel will be utilized from switching network 13 to provide a single interpolated output signal for one of the trunks 22 in FIG. 1.

As each encoded sample arrives from switching network 13, common control and timing 14 of FIG. 1 produces control signals at the other input to FIG. 2B for read/write address memory 67. Memory 67 produces digital address signals on bus 68 for memory 66 and also gating signals which enable converter 64 through delay 65 for the transfer of each code group. As each encoded sample arrives from switching network 13, memory 67 is instructed by common control 14 to identify the destination channel or the location of the code group in each signal frame for transmission on the appropriate one of trunks 22 of FIG. 1. The destination channel therefore determines the line location for each code group in memory 66 which will be sequentially scanned for readout. Memory 67 also produces a digital signal that is applied to subtractor 84. Subtractor 84 receives another signal from the output of divider 77 which is only slightly delayed by delay 70. The signal from divider 77 is a 6-bit binary number wherein the last 5 bits correspond to the read address transmit signal ($RA_T$) and next higher order bit from the divider. This signal on bus 80 reads code words out of memory 66. The difference between the 6-bit signal and the signal from memory 67 serves to divide the time between successive code words of the same signal channel into 12 increments which provides the same resolution as dividing the corresponding framing interval utilized in FIG. 2A into 48 increments. While the output for subtractor 84 from counter 77 ranges from 0 to 48, the counter supplies the $RA_T$ signal to memory 66 which has a range from 1 to 24. The $RA_T$ signal is a binary count that sequentially reads the lines in memory 66 to supply an output signal for each line to office repeater 83 via the signal path including selector 72, parallel-to-serial converter 74, code converter 85, and first-in, first-out (FIFO) memory or buffer 78.

Basic operation of the interpolating process will now be described. As each encoded sample from switching network 13 appears at the output of digital filter 61, memory 67 produces the read/write address transmit (R/W $A_T$) signal which identifies the destination channel of the information signal by address instructions for memory 66 and supplies an input to subtractor 84. Subtractor 84 subtracts the input from memory 67 from the signal supplied by counter 77. The output of subtractor 84 may be considered a phase variable for transmission designated as $\delta_t$. The value of $\delta_t$ is applied to read-only memory 86 which selects the stored coefficient that controls the gain of multiplier 62. The content of read-only memory 86 is listed in the look-up table of FIG. 7. Accordingly, multiplier 62 is assigned a weighting coefficient by read-only memory 86 which determines the contribution of each code group to an interpolated code. On the average, the contributions of four code groups from switching network 13 of FIG. 1 are combined to produce an interpolated code group. Each contribution after the initial one is added to previous contributions by adder 63 until a complete interpolated code group is formed and stored in memory 66 until called for by the $RA_T$ signal from divider 77. The previous contributions are read out of memory 66 and supplied to parallel-to-serial converter 73 via selector 72 for application to the other input of adder 63. The readout occurs when selector 72 is enabled by read/write memory 67.

The output of subtractor 84 is continuously monitored by threshold circuit 91 to detect when the phase variable has a value which indicates that a particular code group is to be used as the first partial term of the series of partial terms that are accumulated in memory 66 to provide an interpolated signal. If $\delta_t$ has a value less than 12, threshold circuit 91 produces a clear signal for memory 66 which eliminates any previous accumulated values in memory 66 corresponding to the address signal produced on bus 68. If the signal from multiplier 62 is the first contribution or partial term of an interpolated code group, it passes on through adder 63 unaltered and enters memory 66 via converter 64. In the next frame received from switching network 13, the signal with the same destination channel is assigned a weighting factor or coefficient by operation of multiplier 62. Memory 86 is instructed by subtractor 84 which again subtracts the addressing signals of memory 66 as is done for each code group supplied by switching network 13 to determine the time of the occurrence of the interpolated code group with respect to the code groups from switching network 13 that contribute to its derivation. The product of the weighting coefficient of multiplier 62 and the code group from switching network 13 is combined with the previous partial term of the same destination channel in adder 63. The accumulated sum of these two partial terms is again stored in memory 66 via converter 64. The enable signal for selector 72 is delayed by delay 65 and applied to memory 66 to enable the signal transfer from converter 64 to the memory. Delay 65 retards the enable signal to compensate for the signal propagation time through converter 73 to the input of converter 64. On the average, this process will be repeated two more times so that four signal samples from switching network 13 are used to produce an interpolated signal which is stored in memory 66. The interpolated signals are read out of memory 66 in a sequence determined by the output of counter 77. Counter 77 also produces an enable signal for selector 72 which transfers the output of memory 66 to converter 74.

Code converter 85 receives the interpolated code groups from converter 74 and changes them into non-linearly encoded groups to form a companded PCM signal. A compres- sion process is used in converter 85 that is the inverse operation of that produced by code converter 48 of FIG. 2A and is described in the aforementioned Kaneko article. The output of code converter 85 is buffered by memory 78 to eliminate short term jitter before application to repeater 83 for return transmission on trunk 22. One input to memory 78 is the recovered clock signal from clock recovery circuit 36 of FIG. 2A. Decoder 79 monitors the signal content of memory 78, and produces a control signal which is applied to voltage controlled oscillator 81 via low-pass filter 82. It should be noted that memory 78, decoder 79, filters 82 and oscillator 81 form a phase lock loop which smooths out short term jitter and temporary frequency misalignment between the interpolated signals produced by memory 66 and the timing operation of office repeater 83 which is synchronized to one of trunks 22.

Figures 6, 7:
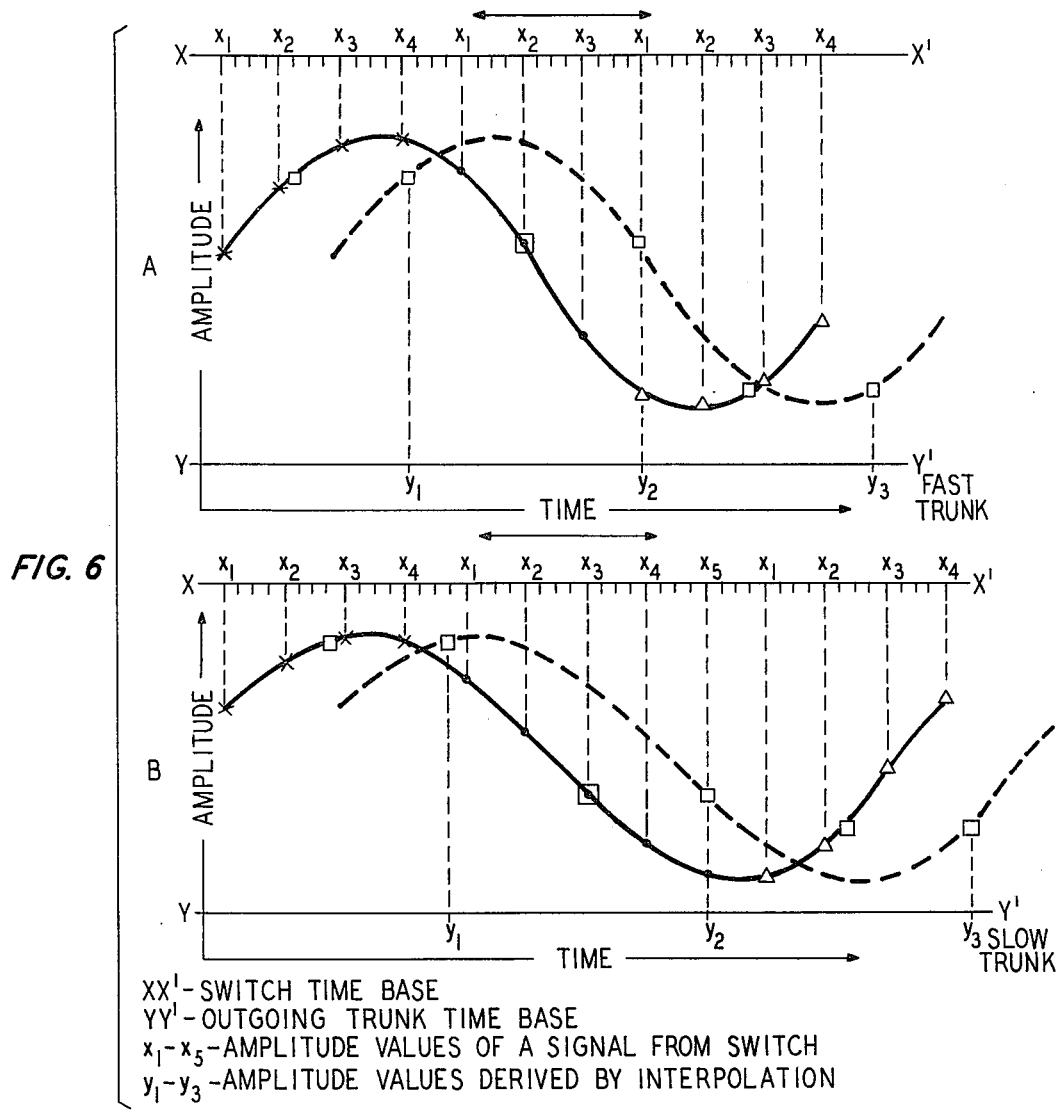
FIGS. 6, 7 and 8 depict different aspects in the operation of the apparatus shown in FIG. 2B.

The interpolation process performed by the apparatus of FIG. 2B is normally a four-step sequence in which partial sums are accumulated in memory 66. These four steps can be expressed as $$p_1[y_n] = h_3 x_1 = a \quad (2)$$

$$p_2[y_n] = h_2 x_2 + a = b \quad (3)$$

$$p_3[y_n] = h_1 x_3 + b = c \quad (4)$$

$$p_T[y_n] = y_n = h_0 x_4 + c \quad (5)$$

where values of $h_j$ are determined by the $\delta_T$ output of subtractor 84 in accordance with FIG. 7. The $h_j$ coefficients correspond to the smooth curve of a third order polynomial which passes through the four points of $x_1$, $x_2$, $x_3$ and $x_4$. Substitution for $c$, $b$, and $a$ expands equation (5) to the more conventional interpolation expression of $$y_n = h_3 x_1 + h_2 x_2 + h_1 x_3 + h_0 x_4. \quad (6)$$

The waveforms of FIG. 6 illustrate the flexibility of the inventive principle. These waveforms are analog representations of a completely digital interpolation process performed by the apparatus of FIG. 2B. An exaggerated rate of change of $\delta_T$ is shown in FIG. 6 than is normally encountered in a transmission environment due to the highly accurate clocks used as timing sources. $\delta T$ usually changes at a very slow rate so that its value stays constant for several frames of the digital bitstream from switching network 13. Waveform A of FIG. 6 shows three successive interpolation operations for the same signal channel for one of trunks 22 that has an exaggerated fast-running time base $YY'$ relative to the time base $XX'$ of switching network 13. Actually, the interpolation operations of the remaining signal channels of the frame are interleaved between two successive interpolated signals of one signal channel. The same is true for waveform B which represents an exaggerated slowly running time base. These differences in timing base rates produce infrequent interpolation operations which are illustrated by the middle interpolated signal of each of the waveforms in FIG. 6. In waveform A only three code words from switching network 13 are utilized in determining the middle interpolated code group while in waveform B five code words from switching network 13 are utilized to produce the middle interpolated code group. It should be understood that in the normal transmission environment these two conditions occur rather infrequently but when they do occur, the interpolated code group must be derived accurately. In determining each of these interpolated code groups the weighting coefficients are utilized in FIG. 7 to determine the contribution of each code word from switching network 13 in deriving the interpolated code group. It should be noted that in waveform A the middle interpolated code group corresponds to the actual value of the second code group from switching network 13. At this time, the value of $\delta_t$ is 36 so that the weighting coefficient is unity. On the other hand, in waveform B the value of the middle interpolated code group corresponds to the third code word from switching the network 13, at which time the value of $\delta_t$ is also 36 and so the weighting coefficient $h_j$ has a value of unity. In FIG. 6 the double direction arrow indicated above each of time bases XX' illustrates the lateral displacement that occurs between the two time bases as frequency drift occurs between them. Since the interpolation is performed on a real time basis, all of the coded words from switching network 13 which contribute to an interpolated code group must be available before the interpolated code group can be determined. Consequently, the dotted waveform or delayed waveform simulates the operating condition that occurs in the apparatus of FIG. 2B. Since this delay has a fixed value, it simply augments the signal propagation time through local central office 11 of FIG. 1 by a constant amount which has no effect upon the quality of the transmitted signals.

Figure 8:
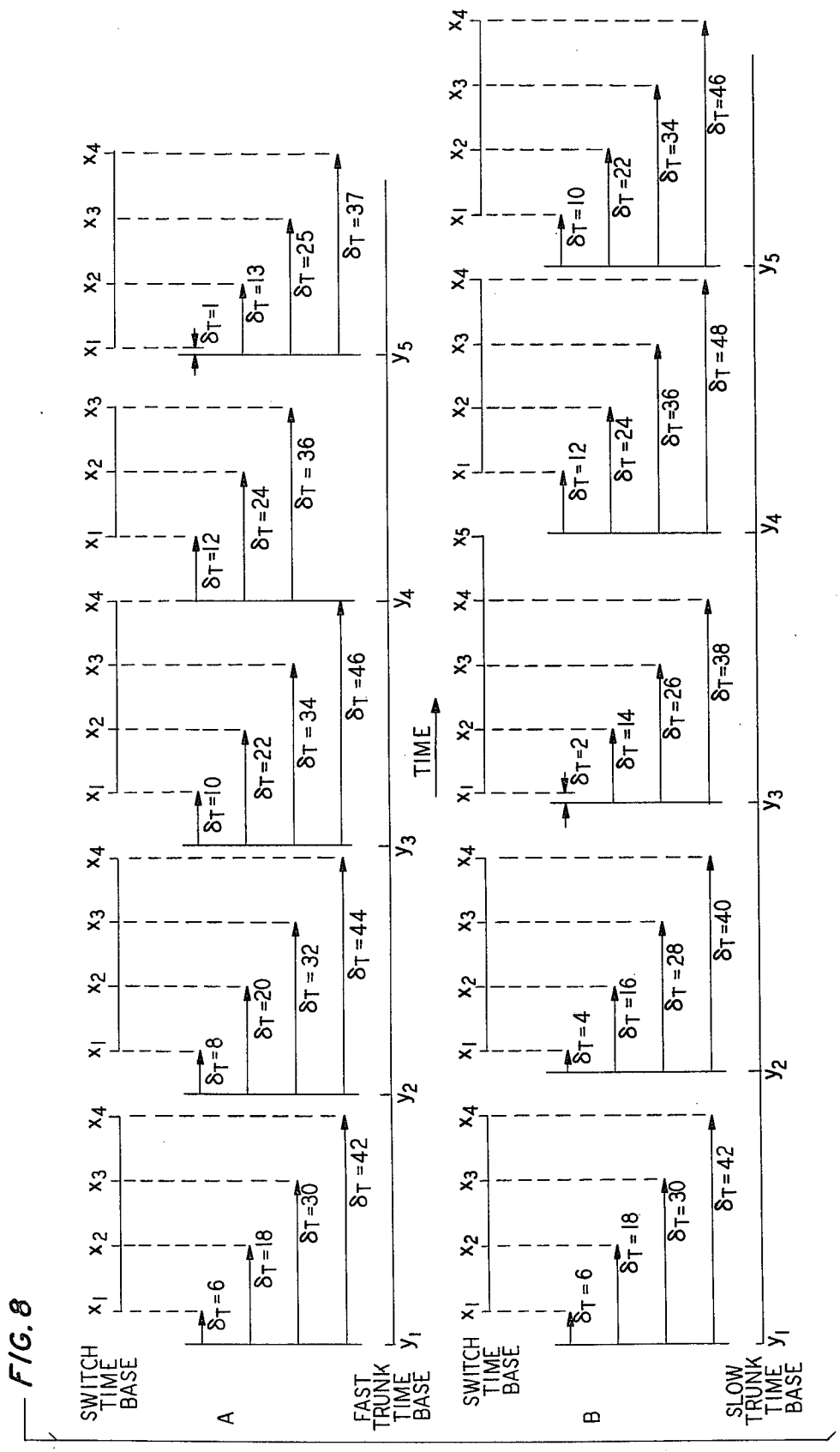

FIG. 8 is a timing diagram which demonstrates another aspect in the operation produced by the apparatus of FIG. 2B. Again the rate of change of $\delta_T$ in FIG. 8 is exaggerated to compress the series of successively interpolated code groups corresponding to a common signal channel required to demonstrate the flexibility of the inventive principle. Portion A of FIG. 8 illustrates the series of steps which take place in the interpolation process when the time base of the trunk is running fast compared to that of switching network 13 of FIG. 1, while portion B depicts the opposite situation of the slowly running trunk time base.

In FIG. 8, time increases moving left to right. Accordingly, the interpolated values of $y_n$ are formed by the $\delta_T$ values and group of $x_n$ values immediately to the left of each $y_n$. It should be noted that subtractor 84 of FIG. 2B produces a value of $\delta_T$ by subtracting the address of the destination channel from the address of the interpolated code group concurrently being read out of memory 66 by counter 77. As is evident from FIG. 8, $\delta_T$ is produced just before each code group from switching network 13 is applied to mutiplier 62. Each time $\delta_T$ has a value between zero and 12, threshold circuit 91 provides a clear signal for memory 66 that erases the accumulated signal at the write address location of the destination channel in the memory. Then the product of the gain of multiplier 62, which is the value of the coefficient supplied by memory 86, and the code group applied to the multiplier is written into the location of the destination channel in memory 66. The coefficient is selected in accordance with the $\delta_T$ output of subtractor 84. The write-in occurs when converter 64 is completely loaded and memory 66 is enabled by the output of delay 65 to transfer the contents of the converter to the memory. Normally three more steps in the interpolation process are performed to complete the interpolation function. In each step after the first, the sum of the previous contributions is supplied by the output of converter 73 via selector 72 for application to the other input of adder 63. The output of adder 63 then corresponds to the sum of the previous contribution or contributions plus the present output of multiplier 62. The location in memory 66 of the destination channel therefore stores the new accumulated value for each step in the interpolation process including the total value produced at the completion of the interpolation process. As can be seen in FIG. 8, the value of $\delta_T$ for the next three steps in the interpolation process after the first step in the process falls in the range 13 to 48 so that the operation of threshold circuit 91 does not interfere with the accumulation function of memory 66.

In portion A of FIG. 8, the fourth interpolated value is only based upon three successive code groups or encoded signal samples of the same signal channel from switching network 13. Thus, FIG. 8 illustrates the same condition which is depicted by waveform A of FIG. 6 for a trunk with a fast running time base relative to the time base of switching network 13. Similarly, the opposite condition occurs in portion B of FIG. 8 wherein five successive encoded samples from the same signal channel from switching network 13 are used to determine an interpolated code group. In this case, the value of $\delta_T$ falls within the range of zero to 12 for $x_5$ since that portion of counter 77 used to generate the $RA_T$ signal counts modulo 48 and the input to subtractor 84 would otherwise exceed 48 for $x_5$. Delay 70 provides a momentary delay in the issuance of the clear signal from threshold circuit 91 so that the accumulation of the contributions ending with $x_4$ can be read out of memory 66 by the $RA_T$ signal on bus 80 before the clear signal occurs. The effect of this operation is to assign zero weight to the $x_5$ contribution to the interpolated code group.

What is claimed is:

1. Apparatus for communicating digital signals comprising code groups between two digital systems wherein a first digital system is synchronized by a first time base and a second digital system is synchronized by a second time base independent of the first time base in frequency and phase, the apparatus comprising:
   storing means in circuit relationship with the first digital system, the storing means receiving and retaining code groups derived from the code groups of the first digital system at a first rate synchronized in accordance with the first time base,
   accessing means for obtaining the contents of the storing means at a second rate synchronized in accordance with the second time base, the accessing means also controlling the occurrence of the code groups for the second digital system,
   timing means for measuring the relative occurrence of the code groups for the second digital system with respect to the occurrence of the code groups produced by the first digital system,
   multiplier means in circuit relationship with the storing means having variable gain controlled by the timing means, the multiplier means producing an output indicative of the product of the quantized amplitude indicated by at least one code group from the first digital system and the gain of the multiplier means,
   adding means for combining the output of the multiplier means with selected contents of the storing means to produce the code groups for the second digital system wherein each code group is derived from at least one code group from the first digital system, and output means for supplying an interpolated signal comprising code groups produced by the adding means, the output means being synchronized to the accessing means so as to supply an interpolated signal compatible with the second digital system whereby the timing means and the multiplier means accommodates differences in frequency and phase between the first and second time bases by preserving substantially the same information content in the interpolated signal as that indicated by the digital signal from the first digital system.

2. The apparatus of claim 1 further comprising translating means disposed between the timing means and the multiplier means, the translating means having a prescribed transfer characteristic defined by weighting coefficients and the translating means is responsive to the timing means by assigning weighting coefficients to the multiplier means that determines the gain therein.

3. The apparatus of claim 2 wherein the translating means has a predetermined transfer characteristic that is a smooth curve whose shape corresponds to a portion of a raised cosine curve.

4. The apparatus of claim 2 wherein the translating means has a predetermined transfer characteristic that has a shape corresponding to a portion of the curve produced by a third order polynomial.

5. The apparatus of claim 2 wherein the code groups of the communicating digital signals are indicative of a plurality of signal channels, time division multiplexed into a bitstream, and the communicating digital signals include synchronizing signals serving to indicate the channel identity of each code group and the apparatus further comprises addressing means for receiving the synchronizing signals to establish a writing address sequence for the successive code groups in the bitstream, the addressing means supplying the writing address sequence to the storing means to determine the spatial arrangement of code groups therein.

6. The apparatus of claim 5 wherein the accessing means establishes the reading address sequence that determines the order in which the code groups of the storing means are obtained to form the interpolated signal.

7. The apparatus of claim 6 wherein the writing address sequence produced by the addressing means and the reading address sequence produced by the accessing means provides an output order of code groups for the second digital system that differs from the order of code groups produced by the first digital system so that the storing means serves to operate as a time-slot interchanger.

8. The apparatus of claim 7 wherein the timing means comprises subtracting means connected to the addressing means and the accessing means to provide an output signal indicative of the difference between the write address sequence and the read address sequence, and the timing means supplies the output signal to the translating means.

9. The apparatus of claim 8 wherein the bit-stream of communicating digital signals comprises successive frames each having at least one code group from each of the plurality of signal channels and the storing means comprises two portions each having sufficient capacity to retain one of the frames.

10. The apparatus of claim 8 wherein the bit-stream of communicating digital signals comprises successive frames each having at least one code group from each of the plurality of signal channels and the storing means has sufficient capacity to retain one of the frames.

11. The apparatus of claim 9 wherein the first rate is less than the second rate and the addressing means includes monitoring means for detecting when alternate frames of the code groups are being received by the storing means and indicating same to the storing means, the storing means responding to the monitoring means by reading alternate frames into alternate portions therein, the accessing means obtaining pairs of code groups from the storing means in successive frames corresponding to the same signal channel at the second rate wherein each code group in the storing means is utilized a plurality of times to produce the code groups for the second digital system, thereby providing a predetermined change in rate substantially equal to the difference between the first rate and the second rate.

12. The apparatus of claim 10 wherein the first rate is greater than the second rate and the multiplier means receives code groups from the first digital system and the apparatus further comprises feedback means for obtaining selective contents of the storing means and supplying same to the adding means, the storing means cooperating with the feedback means and the adding means to operate as an accumulator wherein each output signal produced by the adding means and retained in the storing means is the result of a plurality of code groups corresponding to the same signal channel being applied to the multiplier means, whereby the number of code groups applied to the multiplier means to produce a code group for the second digital system provides a predetermined change in rate substantially equal to the difference between the first rate and the second rate.

13. The apparatus of claim 11 further comprising delaying means disposed in the circuit between the storing means and adding means, the delaying means having sufficient delay so that two successive code groups of the same signal channel are concurrently variable therefrom, the subtracting means, connected to the adding means for obtaining the difference between the two successive code groups and applying same to the multiplier means, and the adding means combining the output supplied by delaying means with the other input applied thereto to produce an interpolated code group for the second digital system.

14. The apparatus of claim 12 further comprising means for indicating when the output of the subtracting means produces an output indicating that the output of the multiplier means is the first of the plurality of outputs to be combined to provide a code group for the second digital system.

* * * * *

UNITED STATES PATENT AND TRADEMARK OFFICE
CERTIFICATE OF CORRECTION

PATENT NO. : 4,006,314

DATED : February 1, 1977

INVENTOR(S) : Joseph H. Condon and Robert B. Kieburtz

It is certified that error appears in the above-identified patent and that said Letters Patent are hereby corrected as shown below:

Column 9, line 60, "date" should read --data--.

Column 12, line 49, "$\delta T$" should read --$\delta_T$--.

Column 16, line 49, change "variable" to --available--.

Signed and Sealed this

Twenty-fourth Day of May 1977

[SEAL]

Attest:

RUTH C. MASON  
Attesting Officer

C. MARSHALL DANN  
Commissioner of Patents and Trademarks